United States Patent [19]

Saito et al.

[11] Patent Number: 5,041,864
[45] Date of Patent: Aug. 20, 1991

[54] IMAGE RECORDING APPARATUS

[75] Inventors: Takehiko Saito; Tōmōya Wada, both of Yamanashi, Japan

[73] Assignees: Fuji Photo Film Co., Kanagawa; Nisca Corporation, Yamanashi, both of Japan

[21] Appl. No.: 588,114

[22] Filed: Sep. 25, 1990

[30] Foreign Application Priority Data

Sep. 25, 1989 [JP] Japan .................................. 1-248873
Sep. 26, 1989 [JP] Japan .................................. 1-250286
Oct. 17, 1989 [JP] Japan .................................. 1-269987
Oct. 17, 1989 [JP] Japan .................................. 1-269988

[51] Int. Cl.$^5$ ............................................. G03B 29/00
[52] U.S. Cl. ......................................... 355/29; 355/28; 355/72
[58] Field of Search ............................. 355/28, 29, 72

[56] References Cited

U.S. PATENT DOCUMENTS 4,786,946 11/1988 Jessop ..................................... 355/29
4,942,422 7/1990 Mashiko et al. ....................... 355/28

Primary Examiner—Monroe H. Hayes
Attorney, Agent, or Firm—Sughrue, Mion, Zinn, Macpeak & Seas

[57] ABSTRACT

An image recording apparatus which is disclosed herein includes a containing section for containing an image recording material which is wound in a rolled form and a body in which the image recording material is utilized for recording an image. The image recording apparatus comprises a feeding device for feeding the image recording material from its one end out of the containing means into the body, a measuring device for measuring the length of the image recording material which is fed out, a cutter for cutting the fed-out portion of the image recording material, a convey mechanism for conveying the cut image recording material pieces within the body to record an image, and a control device for controlling the feeding device and the cutter, so that the image-recording material is fed out and cut up to a length required for removal from the body on the basis of the result of measurement by the measuring device, if the conveying of the image recording material pieces by the convey mechanism is discontinued due to any reason. Therefore, the image recording material pieces of a short length cannot be remained within the body.

16 Claims, 16 Drawing Sheets

IMAGE RECORDING APPARATUS

BACKGROUND OF THE INVENTION

1. Field of the Invention

The present invention relates to an image recording apparatus and pariticularly, to a such an apparatus in which an image recording material wound is cut for recording an image.

2. Description of the Related Art

There are conventionally known image recording apparatus which is designed so that using a light-sensitive material and an image-receiving material as recording materials, an image exposed on the light-sensitive material is transferred onto the image-receiving material by a thermally developing and transferring. The image recording apparatus of this type includes a sensitive material magazine case containing a sensitive material magazine therein and an image-receiving material magazine case containing an image-receiving material magazine therein, both the cases being removably mounted in a body of the image recording apparatus. A length of a light-sensitive material wound into a rolled form is contained in the sensitive material magazine, and a length of an image-receiving material wound into a rolled form is also contained in the receiving material magazine. Nip rollers as first convey means are disposed within each of the magazine cases for clamping each material and pulling out and convey it from the corresponding magazine. A cutter is mounted at a location corresponding to a material delivery side of the nip rollers in the body of the image recording apparatus. The material delivered by the nip rollers is cut into pieces of a pre-determined length by a cutter and fed to an exposure section and a thermally developing and transferring section by convey rollers as second convey means for exposure and thermally developing and transferring treatments.

In such image recording apparatus, if a jamming should occurs in the course of conveying of the light-sensitive material from the magazine case, a door of the image recording apparatus is opened, and a transaction of the jamming is conducted. This causes an exposure of the leading end of the light-sensitive material. For this reason, an exposed portion of the light-sensitive material must be cut and removed.

However, there is a problem that if the length of the cut piece of the light-sensitive material is shorter than a predetermined length (i.e., possible take-out length), it is difficult to remove the light-sensitive material.

In addition, if the image recording apparatus should be stopped for a long period of time due to opening of a power source, a portion of the light-sensitive or image-receiving material pressed by the nip rollers may be deteriorated and cannot be used. Even in such a case, the deteriorated portion of the light-sensitive or image-receiving material must be cut and removed.

Such case is also accompanied by a problem that if the length of the cut piece of the light-sensitive or image-receiving material is shorter than the predetermined length (i.e., possible take-out length), it is likewise difficult to remove the light-sensitive material.

SUMMARY OF THE INVENTION

It is an object of the present invention to provide an image recording apparatus wherein when the conveying of the image recording material is discontinued due to any reason such as a jamming or the opening of a power source, the removal of the cut piece of the image recording material can be simply conducted.

To achieve the above object, according to the present invention, an image recording apparatus including a containing means for containing an image recording material which is wound in a rolled form and a body in which the image recording material is utilized for recording an image, the apparatus comprising a feeding means for feeding the image recording material from its one end out of the containing means into the body, a measuring means for measuring the length of the image recording material which is fed out, a cutter for cutting the fed-out portion of the image recording material, a convey means for conveying the cut image recording material piece within the body to record an image, and a control means for controlling the feeding means and the cutter, so that the image-recording material is conveyed out and cut up to a length required for removal from the body on the basis of the result of measurement by the measuring means, if the conveying of the image recording material piece by the convey means is discontinued due to any reason.

In the image recording apparatus constructed as described above, the image recording material is fed out from the containing means within the body by the feeding means, and the fed-out length thereof is measured by the measuring means. Then, the image recording material is cut into pieces of a predetermined length by the cutter. The cut image recording material pieces are conveyed within the body by the convey means and used for recording the image. Should the conveying of the image recording material pieces by the convey means is discontinued due to any reason, the feeding means and cutter are controlled, so that the image recording material is fed out and cut up to the possible take-out length on the basis of the result of measurement by the measuring means.

Thus, the cut image recording material pieces of a shorter length cannot be remained within the image recording apparatus, and the cut image recording material can be simply removed, because the image recording material is fed out and cut up to the possible take-out length, when the conveying of the image recording material pieces by the convey means is discontinued.

The possiblity for the conveying of the image recording material to be discontinued may be produced when a jamming of the cut image recording material pieces occurs, or when the power source is opened, or when a door of the body is opened after cutting during supplying of the image recording material sheet. Therefore, it is preferred that the above-described feeding-out and cutting treatments are conducted when at least one of the above conditions has been established.

The above and other objects, features and advantages of the invention will become apparent from a reading of the following description of the preferred embodiment, taken in conjunction with the accompanying drawings.

BRIEF DESCRIPTION OF THE DRAWINGS

FIG. 13(B) is a flow chart illustrating an interruption routine started upon mounting of the sensitive material magazine case in the second embodiment;

DESCRIPTION OF THE PREFERRED EMBODIMENTS

Figure 2:
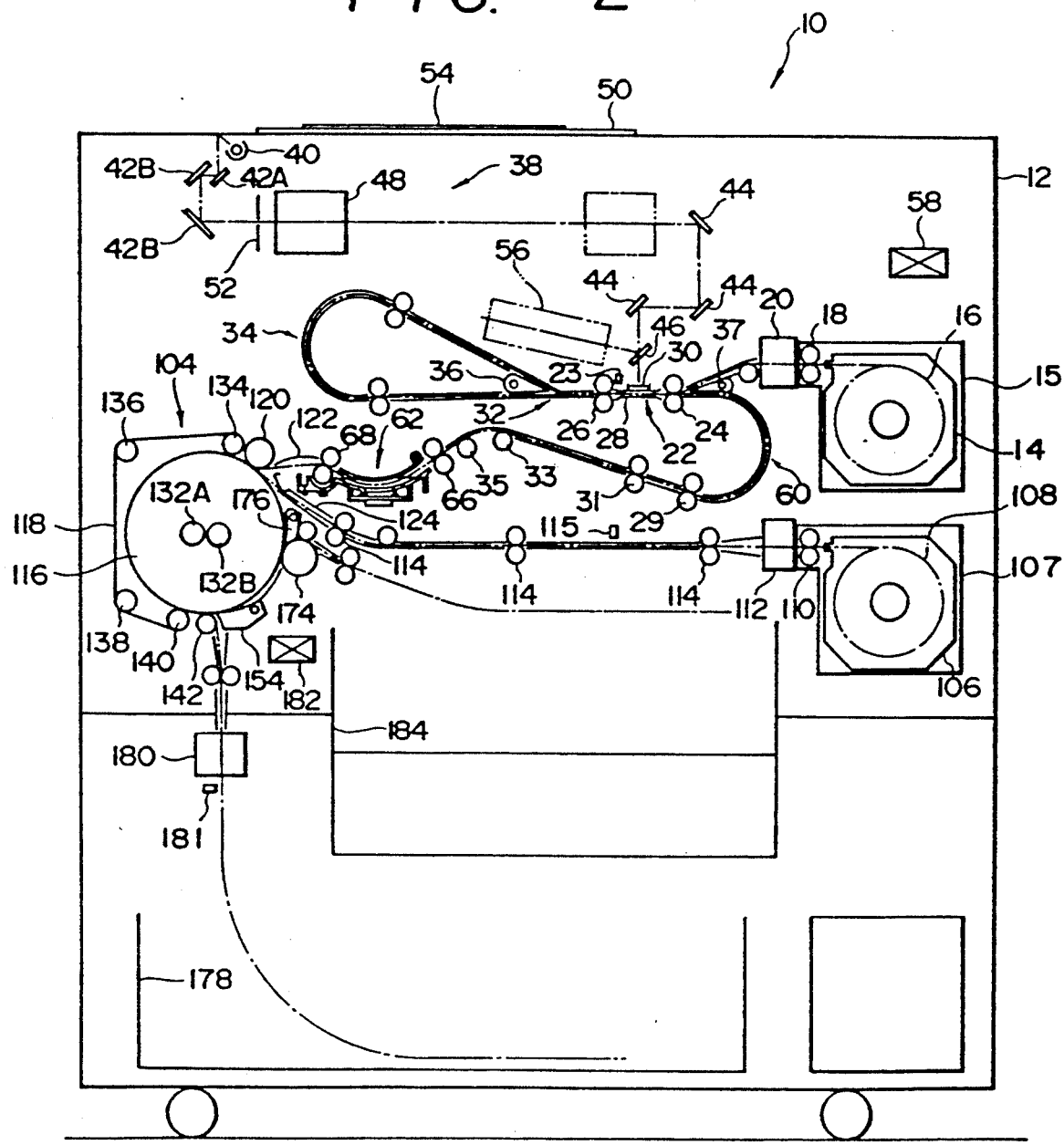
FIG. 2 is a schematic illustration of an image recording apparatus to which the present invention is applicable.

FIG. 2 illustrates a schematic view of the entire construction of an image recording apparatus 10 to which the present invention is applicable.

The image recording apparatus 10 includes a sensitive material magazine case 15 removably disposed in a frame 12 for containing a sensitive material magazine 14. A light-sensitive material 16 is contained in the sensitive material magazine 14 in a rolled form. The light-sensitive material 16 comprises a support or substrate coated with a light-sensitive silver halide, a binder, a coloring matter supplying material and a reducing agent and is wound into a rolled form with a light-sensitive surface inwardly directed. A pair of nip rollers 18 are contained in the sensitive material magazine case 15 at an outlet for the light-sensitive material in the sensitive material magazine 14 for clamping the light-sensitive material 16 and pulling it out of the sensitive material magazine 14. The nip rollers 18 constitutes a portion of a first convey means and is connected through a belt 17 to a pulley fixed to a rotary shaft of a motor 17 serving as a portion of the first convey means during placement of the sensitive material magazine case 15 into the frame 15. A rotary encoder 19 as a portion of a measuring means is connected to the rotary shaft of the motor 17.

A cutter 20 is disposed in the frame 20 in the vicinity of a sensitive material-delivery side of the nip rollers 18 in the sensitive material magazine case 15 placed in the frame 12. An exposure section 22 is disposed downstream of the cutter 20 in a light-sensitive material conveying direction. A pair of convey rollers 24 and a pair of convey rollers 26 as a portion of a second convey means are disposed in the exposure section 22 in the sensitive material conveying direction. A leading end detecting sensor 23 as another portion of the measuring means is also disposed in the exposure section 22 for detecting the passage of a leading end of the light-sensitive material 16. The leading end detecting sensor 23 is comprised of light-emitting and light-receiving elements disposed with a convey path for the light-sensitive material sandwiched therebetween. A guide plate 28 and an exposure surface glass 30 are located between the convey rollers 24 and 26 with the convey path sandwiched therebetween, so that a narrow gap is defined between the guide plate 28 and the exposure surface glass 30. Thus, during travelling between the convey rollers 24 and 26, the light-sensitive material 16 is clamped in a planar form between the guide plate 28 and the exposure surface glass 30, so that any deformations such as curling may be corrected. An inverting section 34 is provided dowstream of the exposure section 22 in the sensitive material conveying direction and comprised of a flapper 36 and a loop-shaped convey path, so that the light-sensitive material 16 may be inverted or turned oppsitely after passage through the exposure section 22 and conveyed again toward the exposure section 22.

An optical exposure system 38 is mounted above the exposure section 22. The optical exposure system 38 comprises a light source 40, movable mirrors 42A and 42B, a plurality of stationary mirrors 44, a swingable mirror 46, and a lens unit 48. A glass manuscript bearing plate 50 is mounted at an upper portion of the frame 12. A slit plate 52 as a lens opening is mounted at a side of the lens unit 49 closer to the movable mirros 42B, and a color control filter (i.e., a CC filter) is disposed in the lens unit 48. The light source 40, the movable mirrors 42A and 42B and the lens unit 48 are movable along the manuscript bearing plate 50. The light source 40 and the movable mirror 42A are moved at a speed two times the moving speed of the movable mirror 42B and the lens unit 48, so that no difference in light path is produced during such movement. This movement causes light to be directed onto a manuscript 54 placed on the manuscript bearing plate 50, so that a reflected light is directed through the plurality of stationary mirrors 44 onto the light-sensitive material 16 positioned in the exposure section 22, thereby providing a scanning exposure of the light-sensitive material 16.

The swingable mirror 46 is disposed for swinging movement into and out of a path for an image light directed into the exposure section 22 via the movable mirrors 42A and 42B and the stationary mirrors 44. With the swingable mirror 46 moved into such light path, light deflected from the swingable mirror 46 is directed into the light detecting sensor 56. The light detecting sensor 56 measures the image density of the manuscript 54 to adjust the color control filter and the opening or slit plate 52 on the basis of the measured value, thereby determining exposure conditions.

A cooling fan 58 is disposed above the sensitive material magazine case 15. The cooling fan 58 cools the exposure section 22 so that the temperature thereof is at 40° C., preferably, at 35° C. or less, while preventing the temperature of the manuscript surface from being increased.

A flapper 37 is located between the convey rollers 24 in the exposure section 22 and the cutter 20, and an inverting section 60 is disposed below the flapper 37. A water applying section 62 is located at an opposite side of the inverting section 60 from the magazine case 15 and below the inverting section 34. As a result of shifting up of the flapper 37, the light-sensitive material 16 subjected to the scanning exposure in the exposure section 22 is conveyed to the inverting section 60 where it is inverted or turned oppositely in the inverting section 60, and it is then conveyed to the water applying section 62 through the convey rollers 29, 31, 33 and 35. A squeeze rollers 68 are disposed downstream of an outlet of the water applying section 62 for removing excessive water from the water-applied light-sensitive material. A thermally developing and transferring section 104 is disposed downstream of the squeeze rollers 68.

On the other hand, a receiving material magazine case 107 containing a receiving material magazine 106 is disposed below the sensitive material magazine case 15 releasably from the frame 12. An image-receiving material is contained in a rolled form in the receiving-material magazine 106. The image-receiving material 108 has a widthwise dimension slightly smaller than that of the light-sensitive material 16 and has its image forming surface coated with a color matter fixing material containing a mordant. A pair of nip rollers 110 are disposed at an image-receiving material outlet of the receiving material magazine 106 for clamping the image-receiving material 108 to pull it out of the receiving material magazine 106. The nip rollers 110 are also rotated by a motor which is not shown, as are the above-described nip rollers 18. A cutter 112 is disposed in the frame 12 just downstream of an image-receiving material outlet of the receiving material magazine case 107.

A sensor 115 for detecting a leading end of the image-receiving material and a pluarlity of convey rollers 114 for conveying the image-receiving material 108 after being cut to the thermally developing and transferring section 104 are located downstream of the cutter 112 in an image-receiving material conveying direction.

The thermally developing and transferring section 104 is provided with a heating drum 116 and an endless pressure belt 118, and a laminating roller 120 is disposed on that outer peripheral portion of the heating drum 116 which is closer to the water applying section 62.

A guide plate 122 is mounted between the laminating roller 120 and the squeeze rollers 68 in the water applying section 62 for guiding the light-sensitive material 16 to the laminating roller 120 in an opposed relation to a back (an oposite side from the image-forming surface) of the light-sensitive material 16 conveyed by the squeeze rollers 68. The guide plate 122 has a ruggedness formed on a surface by embossing, thereby ensuring that the close contact of the guide plate 122 with the water-applied light-sensitive material 16 can be inhibited, and the sensitive material 16 can be smoothly guided.

On the other hand, a blade guide 124 is disposed between the laminating roller 120 and the convey rollers 114 for guiding the image-receiving material 108 conveyed by the convey rollers 114, to the laminating roller 120. The surface of the blade guide 124 is coated with Teflon (trade name) or Teflon T, thereby providing a good sliding of the light-receiving material 108 to prevent the latter from being damaged.

The laminating roller 120 comprises a so-called crown roller having an outside diameter of approximately 29 mm at its axially central portion and has an outer peripheral surface coated with a silicone rubber. The laminating roller 120 is urged into a pressure contact with the outer periphery of the heating drum 116 by a pressing force of approximately 15 kg f applied to its opposite ends.

The heating drum 116 is made from a thin aluminum pipe and in this embodiment, is formed at a thickness of approximately 2 mm, an outside diameter of approximately 156 mm and an axial effective width of approximately 350 mm. An outer surface of the heating drum 116 is coated with Teflon, and an inner surface thereof is coated with a black heat-resistant coating.

A pair of halogen lamps 132A and 132B are disposed within the heating drum 116. The halogen lamps 132A and 132B have output powers of 800 W and 400 W, respectively and heat the surface of the heating drum 116 to about 78° C. In this case, at the start of heating, the two halogen lamps 132A and 132B are turned on together and during the subsequent noraml operation, only the halogen lamp 132A of 800 W is on.

The endless pressure belt 118 in pressure contact with the outer periphery of the heating drum 116 is comprised of a cotton cloth coated with a rubber. The cotton cloth may be made from a heat resistant fiber such as an organic polyamide fiber, e.g., KEBRA or NORMETHOX (both a registered trademark of du Pont de Nemours, E. I., and Co.) by sewing, and is improved in rigidity in a widthwise direction of the belt by using a monofilament in the widthwise direction of the belt. The coating rubber is made of a silicone rubber containing a carbon and has a conductivity.

The endless pressure belt 118 is wrapped around four wrapping rollers 134, 136, 138 and 140, with a portion of the endless belt 118 between the wrapping rollers 134 and 140 being in pressure contact with the outer perihpery of the heating drum 116.

Each of the wrapping rollers 134, 136 and 138 is made of aluminum and formed at its axially opposite ends with a flange portion for preventing the offsetting of the belt. A pressing force of 2.5 kg f (a practical range: 0.5 to 3.9 kg f) is applied to each of the axially opposite ends of the wrapping roller 136 in a direction away from the heating drum, so that a predetermined tension is applied to the endless pressure belt 118.

The wrapping roller 140 comprises a rubber roller, and a motor which is not shown is connected to a rotary shaft of the wrapping roller 140. Thus, when the wrapping roller 140 is rotated by the motor, the endless pressure belt 118 wrapped around the wrapping roller 140 is travelled, causing the heating drum 116 to be rotated in a following manner under the influence of a frictional force between the endless pressure belt 118 and the heating drum 116. When the heating drum 116 is rotated, the laminating roller 120 disposed in pressure contact with the outer periphery of the heating drum 116 is rotated in unison therewith likewise under the influence of a frictional force.

In this case, the feed speed of the light-sensitive or image-receiving material 16 or 108 conveyed by the squeeze rollers 68 or the convey rollers 114 is set about 2% lower than the feed speed of the lighy-sensitive or image-receiving material 16 or 108 conveyed by the heating drum 116 and the laminating roller 120 (in other words, the rotational speed of the outer peripheral surface of the heating drum 116). This ensures that a back tension acts on the light-sensitive material 16 and the image-receiving material 108 when they are fed to the laminating roller 120. It should be noted that a one-way clutch which is not shown is connected to drive shafts of the squeeze rollers 68 and the convey rollers 114, thereby maintaining a predetermined tension.

The leading end of the image-receiving material 108 is conveyed between the heating drum 116 and the laminating roller 120 synchronously with the conveying of the light-sensitive material 16, and when the sensitive material 16 precedes by a predetermined length (approximately 20 mm in the present embodiment), the image-receiving material 108 is fed into between the laminating roller 120 and the heating drum 116 and overlapped onto the light-sensitive material 16.

The light-sensitive and image-receiving materials 16 and 108 overlapped together by the laminating roller 120 are clamped between the heating drum 116 and the endless pressure belt 118 and carried approximately ½ round (between the wrapping rollers 134 and 140) while remaining overlapped. When the light-sensitive material 16 is heated during such carrying, it emits a migratable coloring matter which is then transferred onto a coloring matter fixing layer of the image-receiving material 108 to provide a transferred image.

A bending guide roller 142 and a peel-off pawl 154 are disposed on a lower portion of the heating drum 116 downstream of the endless pressure belt 116 in a material feed direction. The peel-off pawl 154 engages only the leading end of that one of the light-sensitive material 16 and the image-receiving material 108 clamped and carried between the endless pressure belt 118 and the heating drum 116, which precedes by the predetermined length and overlapped on the other 108, thereby peeling off such leading end from the outer periphery of the heating drum 116, and the bending guide roller 142 guides the peeled-off light-sensitive material 16.

Disposed below the peel-off claw 154 are a cutter 180 for cutting the light-sensitive material 16, a sensor 181 for detecting the passage of the light-sensitive material, and a light-sensitive material waste containing box 178, so that the light-sensitive material 16 separated from the image-receiving material 108 peeled off from the outer periphery of the heating drum 116 is cut by the cutter 108 into pieces which are then collected into the light-sensitive material waste containing box 178.

A drying fan 182 is located sideways of the peel-off claw 154 for drying the image-receiving material 108 by feeding air.

A peel-off roller 174 and a peel-off claw 176 are disposed above the peel-off claw 154 in the vicinity of the heating drum 116, so that the image-receiving material 108 separated from the light-sensitive material 16 and travelled with the movement of the heating drum 116 may be peeled off from the outer periphery of the heating drum 116. The peeled-off material 108 is accumulated onto a tray 184.

Figure 3:
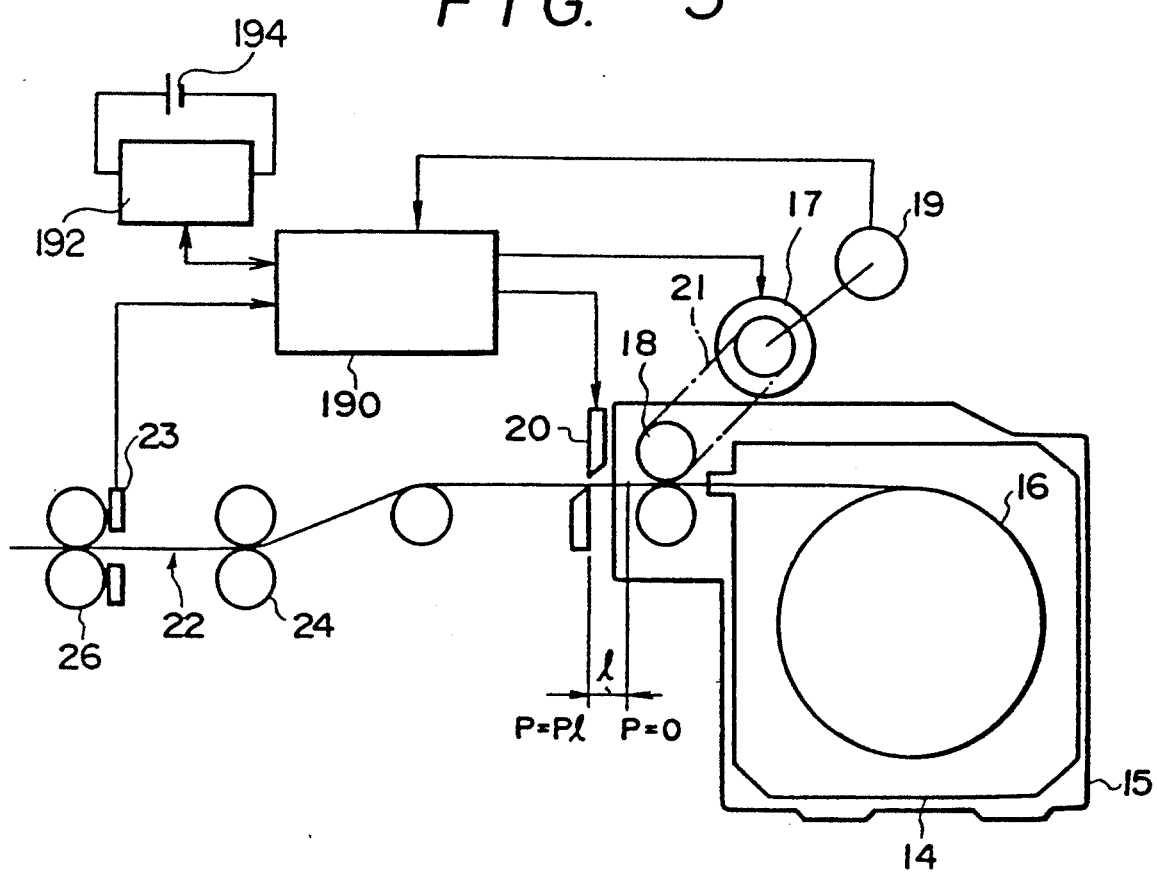
FIG. 3 is a block diagram of the first embodiment in which the present invention is applied to a light-sensitive material supply section.

FIG. 3 illustrates a block diagram of a control system of the present embodiment. The control system controls the optical exposure system described above, but is not directly relevant to the present invention and hence, only parts relevant to the present embodiment are illustrated in this Figure. The rotary encoder 19 and the leading end detecting sensor 23 are connected to a microcomputer 190 as control means. The microcomputer 190 is connected to the motor 17 and the cutter 20 through a driver which is not shown. Moreover, an arrangement for the imgae-receiving material is similar to the above arrangement and hence, is not shown.

A back-up RAM 192 is connected to the microcomputer 190 and backed up by a litium cell 194. Alternatively, EPROM may be used in place of the back-up RAM 192.

The operation of the above-described image recording apparatus 10 will be described below. The light-sensitive material 16 pulled out of the sensitive material magazine 14 by the nip rollers 18 is cut into pieces of a predetermined length by the cutter 20, passed through the exposure section 22 and conveyed toward the flapper 36. The flapper 36 guides the light-sensitive material 16 to a convey path located above the flapper 36. The guided light-sensitive material 16 is inverted in the inverting section 34 and conveyed back to the exposure section 22. When the light-sensitive material 16 is nipped between the convey rollers 26, the operation of the convey rollers 26 is once stopped, so that the light-sensitive material 16 is brought into a standby state immediately upstream of the exposure section 22.

On the other hand, prescanning of the manuscript 54 is conducted, while the sensitive material 16 is being conveyed. More specifically, the light source 40 is first moved, and the reflecting mirror 46 is moved into the light path. so that the image density of the image of the manuscript 54 (in other words, whether the density of the image of the manuscript 54 is of a printing or photographic level) is measured, and on the basis of the measured value, the color control filter and the opening or slit plate 52 are adjusted.

Then, the reflecting mirror 46 is moved out of the light path, and the light source 40, the movable mirrors 42A and 42B and the lens unit 48 are moved back to a home position (i.e., an image scanning start position).

Thereupon, the operation of the convey rollers 24 and the convey rollers 26 are restarted, causing the light-sensitive material 16 to be passed through the exposure section 22 at a speed of approximately 100 mm/sec. Concurrently with the passage of the light-sensitive material 16 through the exposure section 22, the light source 40, the movable mirrors 42A and 42B and the lens unit 48 are moved along the manuscript 50, thereby providing a scanning exposure of the light-sensitive material. In this case, the failure of exposure cannot occur due to an increase in temperature, because the exposure section 22 is forcedly cooled by the cooling fan 58.

When the exposure is started, i.e., the operation of the convey rollers 24 and 26 is restarted, the flapper 37 is shifted up, thereby permitting the light-sensitive material 16 after being exposed to be passed to the inverting section 60. The light-sensitive material is inverted in the inverting section 60 and then fed into the water applying section 62.

In the water applying section 62, water as an image forming solvent is applied to the light-sensitive material 16, and the excessive water is removed by the squeeze rollers 68. The water-applied sensitive material 16 is fed into the thermally developping and transferring section 104 by the squeeze rollers 68.

On the other hand, the image-receiving material 108 is also pulled out of the receiving material magazine 106 by the nip rollers 110; cut into a length shorter than that of the light-sensitive material 16 by the cutter 112, and then conveyed by the convey rollers 114 into the thermally developing and transferring section 104. After such cutting, the nip pressure of the nip rollers 110 is released by a nip releasing mechanism which is not shown, thereby preventing the leading end (image-forming surface) of the image-receiving material 108 from being deformed due to nipping for a long period of time.

Now, the image-receiving material 108 is conveyed to the thermally developing and transferring section 104 at a timing synchronous with the conveying of the light-sensitive material 16, and when the sensitive material 16 precedes by the predetermined length (approximately 20 mm in the present embodiment), the image-receiving material 108 is fed into between the laminating roller 120 and the heating drum 116 and overlapped or superposed onto the sensitive material 16.

In this case, a guide plate 70 is disposed between the laminating roller 120 and the squeeze rollers 68 in the water applying section 62 and hence, the light-sensitive material 16 fed from the squeeze rollers 68 is reliably guided to the laminating roller 120. In addition, the blade guide 124 is disposed between the laminating roller 120 and the convey rollers 114 for the image-receiving material 108 and hence, the image-receiving material 108 is also reliably guided to the laminating roller 120.

After the leading end of the light-sensitive material 16 guided to the laminating roller 120 to precede from the image-receiving material 108 has been clamped between the laminating roller 120 and the heating drum 116, no back tension acts on the sensitive material 16 to produce a looseness, because the feed speed of the sensitive material 16 conveyed by the squeeze rollers 68 is set about 2% lower than the feed speed of the light-sensitive material 16 clampedly conveyed by the heating drum 116 and the laminating roller 120 (in other words, the rotational speed of the squeeze rollers 68).

Then, when the leading end of the image-receiving material 108 guided to the laminating roller 120 has reached a point of pressure contact of the laminating roller 120 with the heating drum 116, the image-receiving material 108 is sequentially overlapped or superposed onto the light-sensitive material 16. Even in this case, no back tension acts on the image-receiving material 108 to produce a looseness, because the feed speed of the image-receiving material 108 conveyed by the convey rollers 114 is set lower than the feed speed of the image-receiving material 108 clampedly conveyed by the heating drum 116 and the laminating roller 120. Therefore, the light-sensitive material 16 and the image-receiving material 108 are uniformly overlapped together without generation of wrinkels.

A one-way clutch which is not shown is mounted on each of the drive shafts of the squeeze rollers 68 and the convey rollers 114. The tension acting on the light-sensitive material 16 and the image-receiving material 108 is maintained at a predetermined value by the one-way clutches and hence, the both materials 16 and 108 cannot be damaged or failed to be conveyed due to an excessive tension.

In such case, the peripheral portion of the light-sensitive material 16 is overlapped onto the image-receiving material 108 with all the four sides thereof projecting from the peripheral portion of the image-receiving material 108, because both the widthwise and lengthwise dimensions of the image-receiving material 108 are smaller than those of the light-sensitive material 16.

The light-sensitive and image-receiving material 16 and 108 overlapped together by the laminating roller 120 are clampedly conveyed approximately ½ round (between the wrapping rollers 134 and 140) of the heating drum 116 between the heating drum 116 and the endless belt 118 while remaining overlapped together. When the light-sensitive material 16 has been heated during such conveying, it emits the migratable coloring matter which is then transferred onto the coloring matter fixing layer of the image-receiving material 108 to provide a transferred image.

In such case, a predetermined pressure can be applied to each of the materials without misalignment of the materials in the course of conveying, thereby providing an even, good transferred image, because the light-sensitive and image-receiving materials 16 and 108 are uniformly overlapped together, and the peripheral portion of the light-sensitive material 16 is in close contact with of the outer periphery of the heating drum 116 with all the four sides thereof projecting from the peripheral portion of the image-receiving material 108.

In addition, because the endless pressure belt 118 is forcedly rotated directly by the wrapping rollers 140 connected to the motor, it is reliably travelled at a predetermined speed even if the wrapped portion thereof is curved at a larger curvature and at a plurality of points. Further, because the heating drum 116 has a smaller resistance to the rotatively driving force and the endless pressure belt 118 is in pressure contact with the heating drum 116 in a wide extent, the rotative force from the endless belt under the influence of a friction is reliably transmitted to the heating drum 116 (i.e., transmitted without a loss in portion of the rotative force). For this reason, a difference in rotational speed cannot be produced between the endless belt 118 and the heating drum 116. Therefore, the light-sensitive and image-receiving materials 16 and 108 clampedly conveyed by the endless pressure belt 118 and the heating drum 116 cannot be offset due to a shear force produced between the both materials, ensuring that a good image can be provided without generation of a shear in transfer.

Further, because the endless pressure belt 118 has a conductivity, a static electrocity is prevented from being generated due to a friction of the heating drum 116 and the endless pressure belt 118 or the light sensitive or image-receiving material 16 or 108, and a fog cannot be generated in the image provided in the image-receiving material 108.

Thereafter, when the light-sensitive and image-receiving materials 16 and 108 are clampedly conveyed to reach the lower portion of the heating drum 116, the peel-off claw 154 engages the leading end of the light-sensitive material 16 conveyed preceding by the predetermined length from the image-receiving material 108, thereby peeling the leading end of the light-sensitive material 16 off the outer periphery of the heating drum 116. Further, the peeled light-sensitive material 16 is wrapped around and bent downwardly by the bending guide roller 142, and cut by the cutter 180 into fine pieces which are then accumulated into the sensitive material waste containing box 178.

On the other hand, the image-receiving material 108 separated from the light-sensitive material 16 and travelled in close contact with the heating drum 116 is travelled via between the heating drum 116 and the peel-off claw 176 spaced from the outer periphery of the heating drum 116 to the peel-off roller 174. It is peeled off from the outer periphery of the heating drum 116 by the peel-off roller 1174 and the peel-off claw 176 and accumulated onto the tary 184.

A control routine of the control system will be described below. The control routine for the image-receiving material is similar to that for the light-sensitive material and hence, only the control routine for the light-sensitive material will be described.

Figure 7:
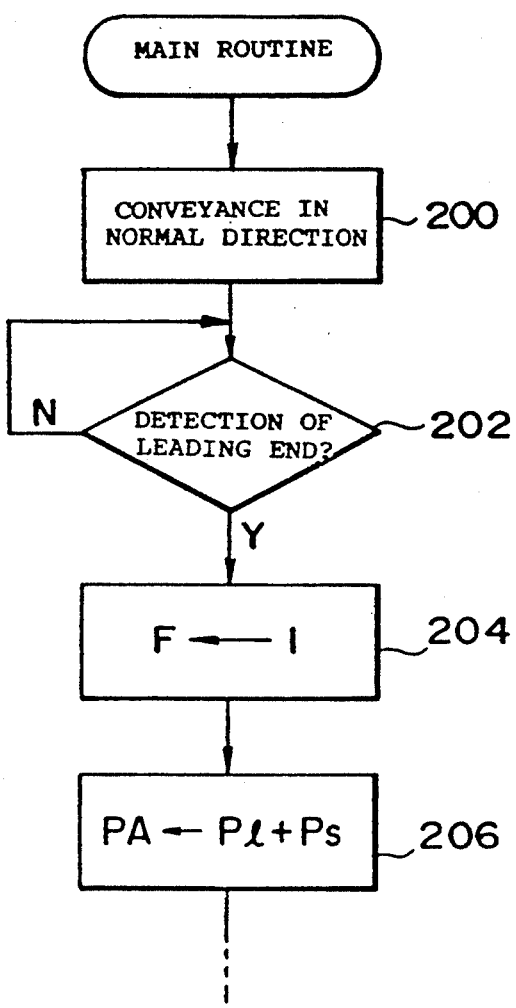
FIG. 7 is a flow chart illustrating a portion of a main routine in the first embodiment.

FIG. 7 illustrates a portion of a main routine started when reproduction start switch (not shown) of the image recording apparatus 10 is turned on. When the reproduction start switch is turned on, the motor 17 is rotated in a normal direction at a step 200. The rotation of the motor 17 in the normal direction is transmitted through the belt 21 to the nip rollers 18, thereby rotating the nip rollers 18 in a direction to pull out the light-sensitive material 16 (i.e., in a normal direction). As a result, the light-sensitive material 16 with its leading end nipped between the nip rollers 18 is conveyed away from the sensitive material magazine case 15. When the conveying is started, a pulse is delivered from the rotary encoder 19. At a next step 202, it is judged whether or not the leading end 23 has detected the leading end. When it is decided that the leading end has been detected, a leading end detecting flag F is set at a step 204, and the sum of a pulse number $P_0$ corresponding to the length of a reproduction size in the light-sensitive material conveying direction with a value of a size pulse PA being determined by a reproduction size determining switch (not shown) and a pulse number Ps corresponding to the conveying distance from the leading end of the light-sensitive material 16 contained in the sensitive material magazine case 15 to a point of disposition of the leading end detecting sensor 23 is determined at a step 206.

Figure 4:
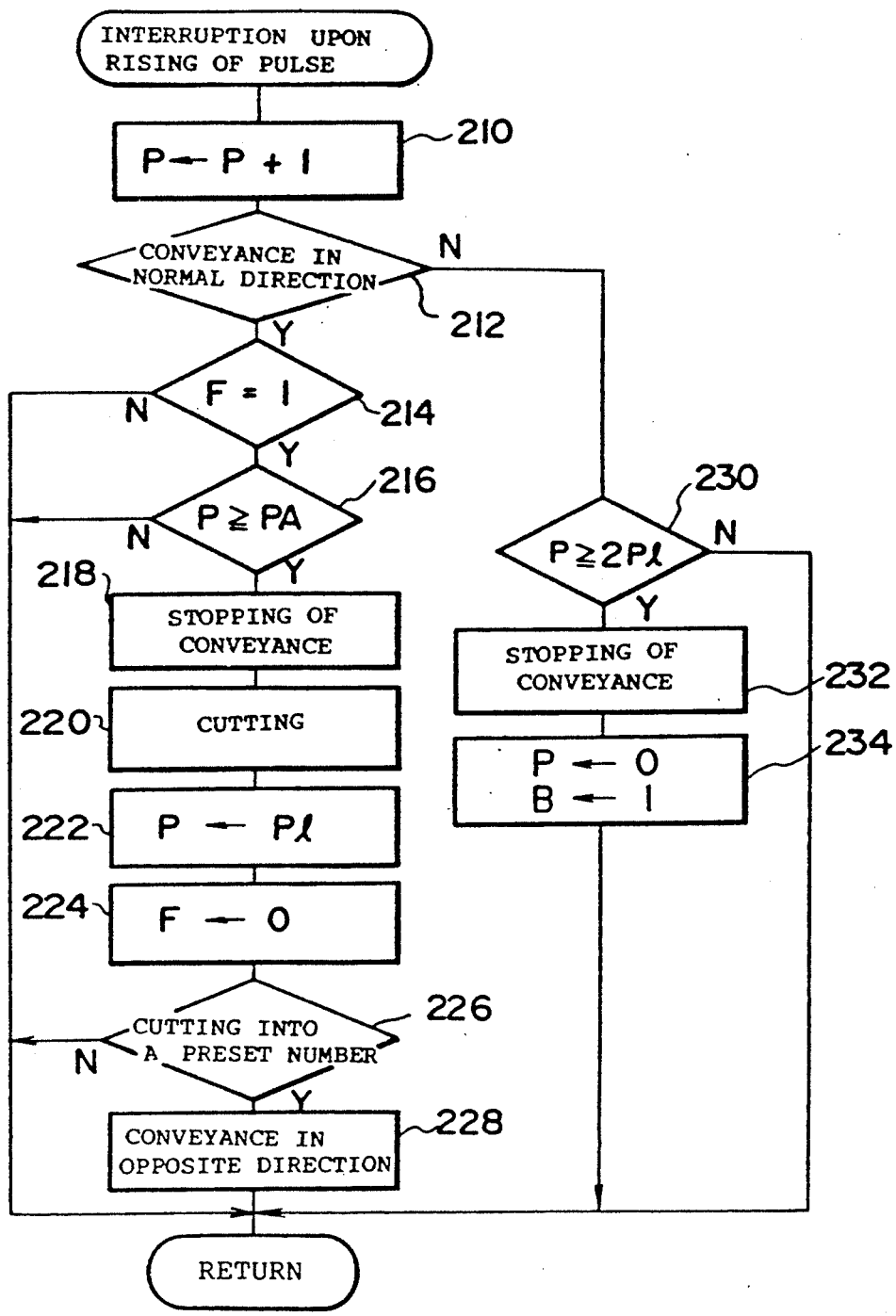
FIG. 4 is a flow chart illustrating an interruption routine started by interruption upon rising of a pulse in the first embodiment.

FIG. 4 illustrates an interruption routine started by interruption upon rising of the pulse delivered from the rotary encoder 19, wherein a pulse number P is increased at a step 210. It is judged at a next step 212 whether or not the light-sensitive material is conveyed in the normal direction. If the light-sensitive material is conveyed in the normal direction, then it is judged at a step 214 whether or not the leading end detecting flag F is set. When the flag F is reset, the process is returned directly to the main routine. When the flag is set, it is judged at a step 216 whether or not the pulse number P is equal to or more than the size pulse PA. If $P<PA$, then the process is returned directly to the main routine. If $P \geq PA$, then the conveying of the light-sensitive material 16 is stopped at a step 218, and a cutting signal is delivered at a step 220, thereby cutting the light-sensitive material 16 by the cutter. At a next step 222, the pulse number P is set at a pulse number Pl corresponding to a distance l from the cutter 20 to the leading end of the light-sensitive material 16 unwound and contained in the magazine case. This is because the conveying of the leading end of the light-sensitive material 16 after being cut by the cutter 20 is equivalent to that over a distance corresponding to the pulse number Pl, because the pulse is counted with the position of the leading end of the unwound sensitive material 16 being defined as a reference position (P=0).

At a next step, the leading end detecting flag F is reset, and at a step 226, it is judged whether or not the light-sensitive material 16 has been cut to the number of reproductions set by a reproduction-number setting key. When the number of cuttings is equal to the preset number of reproductions, the motor is controlled to convey the light-sensitive material 16 in an opposite direction, i.e., in an unwiding direction at a step 228.

The pulse is delivered from the rotary encoder 19 even when the light-sensitive material 16 is being conveyed in the unwinding direction, and the routine in FIG. 4 is carried out by interruption and therefore, the pulse number is counted at the step 210. It is decided at the next step 212 that the light-sensitive material is being conveyed in the opposite direction. Therefore, the process is advanced to a step 230 at which it is judged whether or not the pulse number P has become eqaul to or more than a predetermined value 2P. Because P=Pl immediately after cutting of the light-sensitive material 16, the pulse number 2P becomes 2Pl at a time point when the light-sensitive material 16 has been unwound by the distance l from the cutting position. For this reason, 2Pl is set as a predetermined value. When $P \geq 2Pl$, the leading end of the light-sensitive material 16 is in a state contained within the sensitive material magazine case 15. Hence, the conveying of the light-sensitive material 16 is stopped at a step 232, and at a step 234, the counted value P is set at zero (0), and an unwind completing flag B is set. On the other hand, if $P<2Pl$ at the step 230, then the process is returned directly to the main routine.

As described above, the control is performed, so that the leading end of the light-sensitive material 16 unwound by the distance l is accomodated into the sensitive material magazine case 15, when the light-sensitive material 16 has been cut times equal to the preset number of reproductions.

Figure 1:
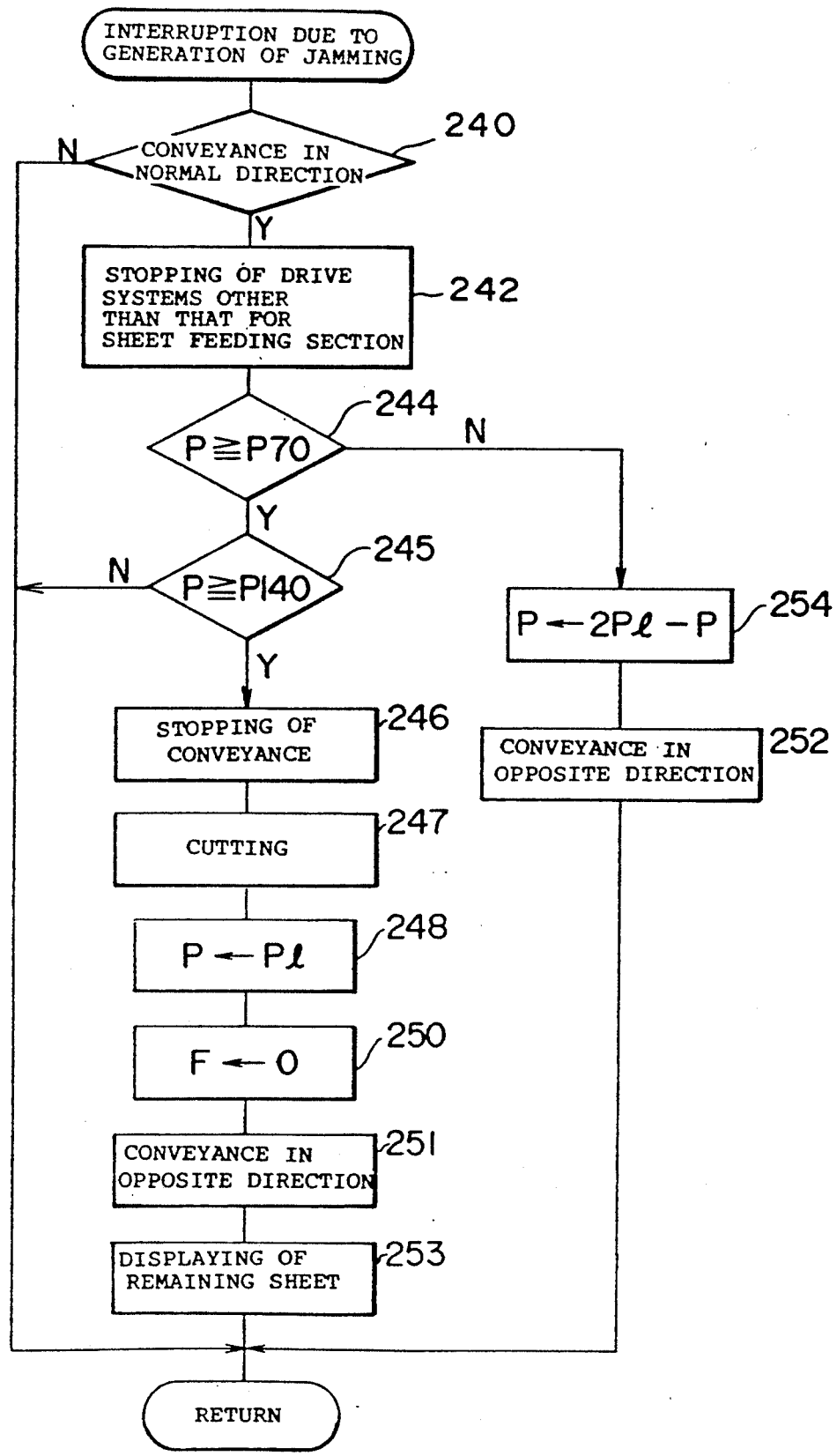
FIG. 1 is a flow chart illustrating an interruption routine started upon occurence of a jamming in a first embodiment of the present invention.

FIG. 1 illustrates an interruption routine started by interruption when a jamming is produced, wherein it is judged at a step 240 whether or not the light-sensitive material 16 is being conveyed in the normal direction. When the light-sensitive material 16 is being conveyed in the opposite direction, the material 16 is being unwound and hence, the process is returned directly to the main routine. When the light-sensitive material 16 is being conveyed in the normal direction, the driving systems other than that for a feeding system are stopped at a step 242. It is judged at a step 244 whether or not the pulse number P has become equal to or more than a level P70 corresponding to a predetermined distance (e.g., 70 mm). If $P<70$, then the length of light-sensitive material 16 conveyed out is shorter, and it is possible to directly unwind the light-sensitive material 16. Therefore, the motor 17 is controlled so that the light-sensitive material 16 is unwound at a step 252 after the pulse number is set at 2Pl—at a step 254.

More specifically, when $P<P70$, the light-sensitive material 16 has been already conveyed out by a distance corresponding to the pulse number P and hence, it is only required to unwind the light-sensitive material 16 by the distance corresponding to the pulse number P. If the pulse number is set at 2Pl to unwind the light-sensitive material 16 by the distance corresponding to the pulse number, P=2Pl with the leading end accomodated in the sensitive material magazine case 16. Therefore, the process is advanced from the step 230 to the step 232 at which the unwinding is stopped.

On the other hand, when $P \geq P70$, the length of sensitive material conveyed out is longer and hence, it is judged at a step 245 whether or not the pulse number P has become equal to or more than a possible take-out length (e.g., P140, 140 mm). When $P<P140$, the process is directly returned. When $P \geq P140$, the conveying of the light-sensitive material 16 is stopped at a step 246, and the cutting signal is produced to cut the light-sensitive material 16 at a step 247. The pulse number P is set at the reference pulse number P at a step 248 and then, the leading end detecting flag F is reset at a step 250. The light-sensitive material 16 is conveyed in the opposite direction at a step 251. Then, at a step 253, the remaining of the light-sensitive material 16 is displayed, for example, on a monitor mounted in an operating section.

As a result, the length of ligh-sensitive material remaining in the image recording apparatus 10 is equal to or more than the possible take-out length and hence, when the conveying-out of the light-sensitive material 16 is discontinued due to a jamming, the taking-out of an image-recording material can be simply performed.

Figure 5:
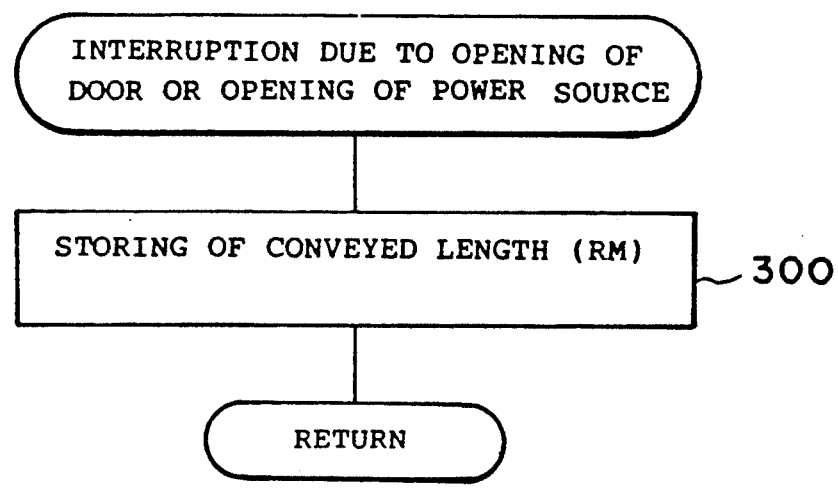
FIG. 5 is a flow chart illustrating an interruption routine started upon opening of a door or a power source in the first embodiment of the present invention.

FIG. 5 illustrates an interruption routine started by interruption when a door is opened or a power source is opened, wherein a length (PM) of the light-sensitive material 16 already conveyed out is stored in a back-up RAM 192 at a step 300. As a result, the length (PM) of the light-sensitive material 16 conveyed into the image recording apparatus 10 has been stored even at a point when the power source has been opened.

Figure 6:
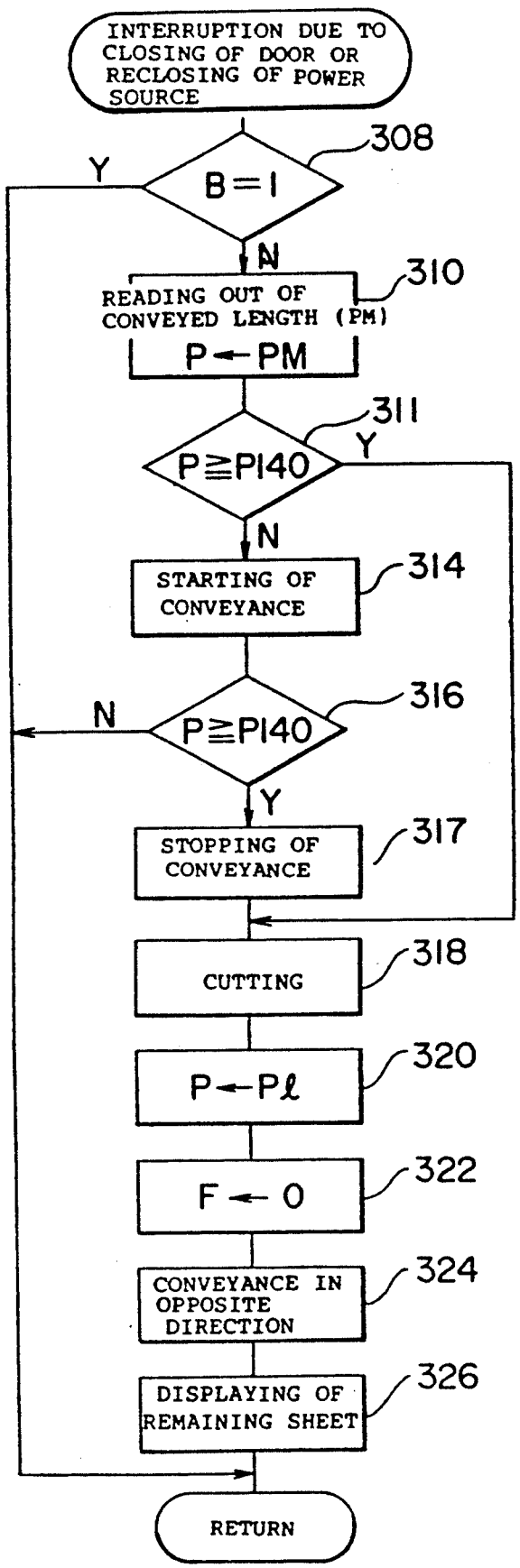
FIG. 6 is a flow chart illustrating an interruption routine started upon closing of a door or reclosing of a power source in the first embodiment of the present invention.

FIG. 6 illustrates an interruption routine started by interruption when the door is closed or the power source is reclosed, wherein it is judged at a step 308 whether or not the unwind completing flag B has been reset. When it is decided that the unwind completing flag B has been set, the process is returned. When it is decided that the unwind completing flag B has been reset, the take-out length PM stored in the back-up RAM 192 is read and brought to the pulse number P at a step 310. It is judged at a step 311 whether or not the take-out length P is equal to or more than 140 mm. When $P \geq P140$, the conveying of the light-sensitive material 16 is started at a step 314, and it is judged at a step 316 whether or not the pulse number P has become equal to or more than P140. When $P < P140$, the process is directly returned. When $P \geq P140$, the conveying of the light-sensitive material 16 is stopped at a step 317, and a cutting signal is produced at a step 318 to cut the light-sensitive material 16 by the cutter. At a next step 320, the pulse number P is set at the reference pulse number Pl. Then, at a step 322, the leading end detecting flag F is reset, and at a step 324, the light-sensitive material 16 is conveyed in the opposite direction. Then, at a step 326, the remaining of the light-sensitive material 16 is displayed, for example, on a monitor mounted in the operating section.

As a result, the length of the light-sensitive material 16 remaining in the image recording apparatus 10 at the point when the door is closed or the power source is reclosed, becomes equal to or more than the possible take-out length. Therefore, when the conveying-out of the light-sensitive material 16 is discontinued due to the fact that the door is closed or the power source is reclosed, the taking-out of the image-recording material can be simply performed.

While the above description has been made with regard to the accomodation of the leading end of the light-sensitive material, it will be understood that the same description is likewise applicable to the image-receiving material 108. In addition, while the above description has been made with regard to the image recording apparatus utilizing a thermally developing and tranbsferrinng technique, it will be also understood that the present invention is applicable to an apparatus using an image-recording material wound into a rolled form, e.g., a facsimile or the like.

A second embodiment of the present invention will now be described.

In the description ot this embodiment, the same parts or components as those in the first embodiment are designated by the same reference characters as those used in the first embodiment, and the description thereof is omitted.

Figure 8:
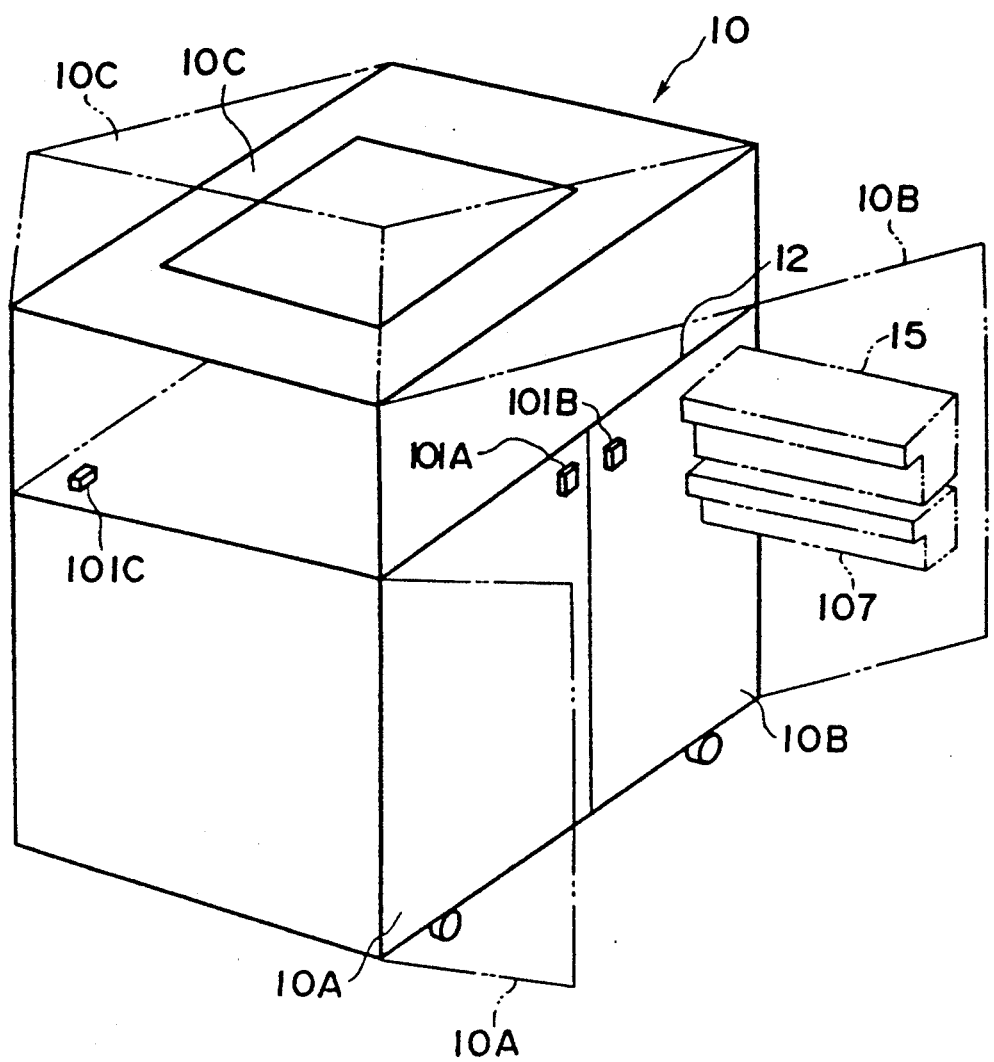
FIG. 8 is a schematic illustration of an image recording apparatus according to a second embodiment of the present invention.

As shown in FIG. 8, an image recording apparatus 1010 includes front covers 10A and 10B in a front thereof. An end of each of the front covers 10A and 10B in a widthwise direction of the image recording apparatus 1010 is pivotally secured to the frame 12, so that the front covers 10A and 10B can be opened as shown by a phantom lines in FIG. 8. Microswitches 101A and 101B are disposed at portions of the frame 12 corresponding to the front covers 10A and 10B, respectively and designed to be turned off when the front covers 10A and 10B are opened.

An upper portion 10C of the image recording apparatus 1010 is adapted to be opened upwardly by pivotal movement about a lower portion of widthwise one end of the image recording apparatus 1010, as shown by a phantom line in FIG. 8. Further, a microswitch 101C is disposed at a location of the frame 12 corresponding to the upper portion 10C and designed to be turned off when the upper portion 10C is opened.

Figure 9:
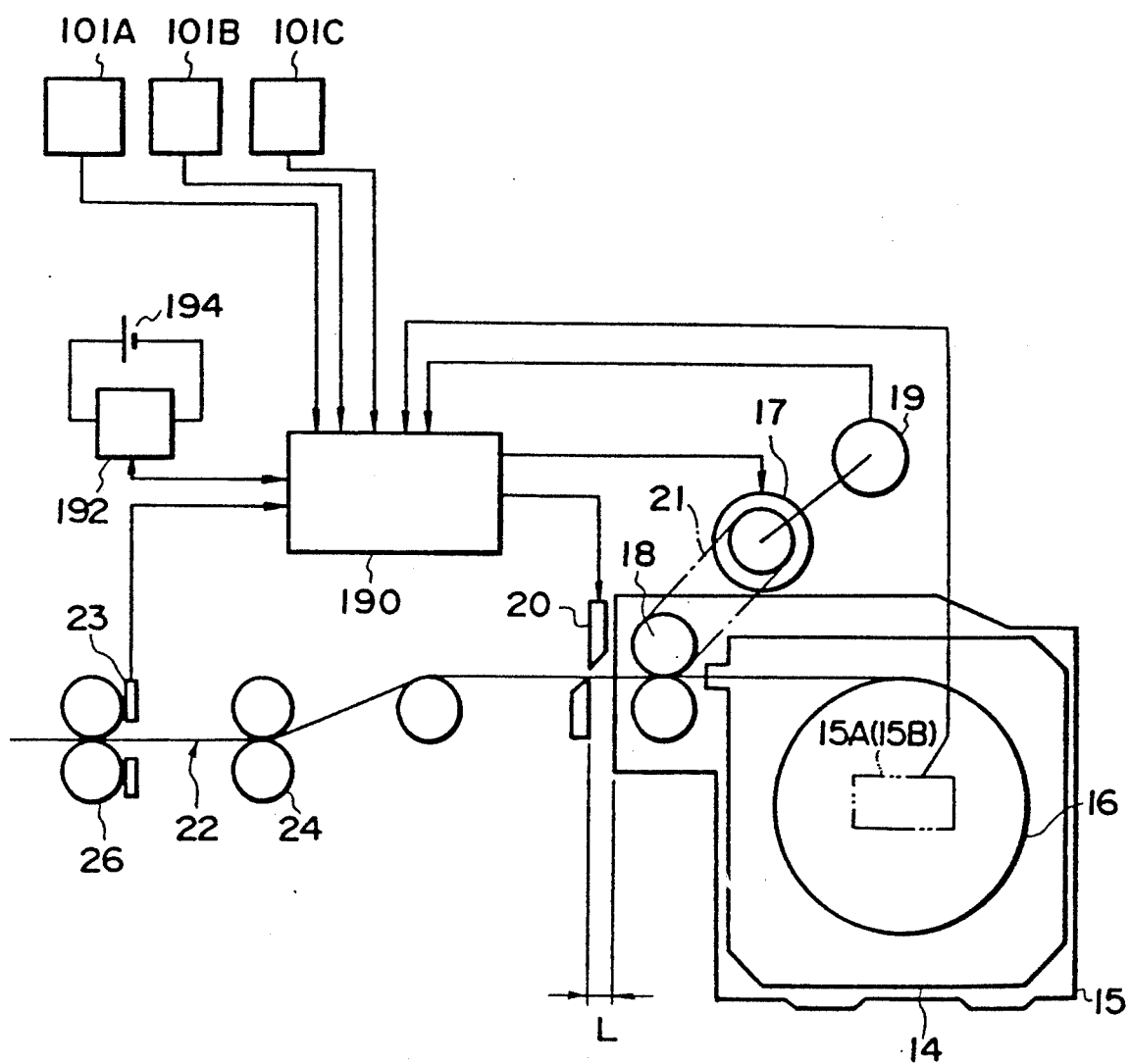
FIG. 9 is a block diagram of a light-sensitive material supply section in the second embodiment.

As shown in FIG. 9, the microswitches 101A, 101B and 101C are connected to a microcomputer 1190 as control means.

A sensitive material magazine case 15 for containing a sensitive material magazine 14 is removaly disposed in the frame 12 of the image recording aparatus 1010. The magazine case 15 is adapted to be pulled out in front of the image recording apparatus 1010 by means of a guide rail (not shown) with the front cover 10B opened as shown by the phantom line in FIG. 8.

Figure 10:
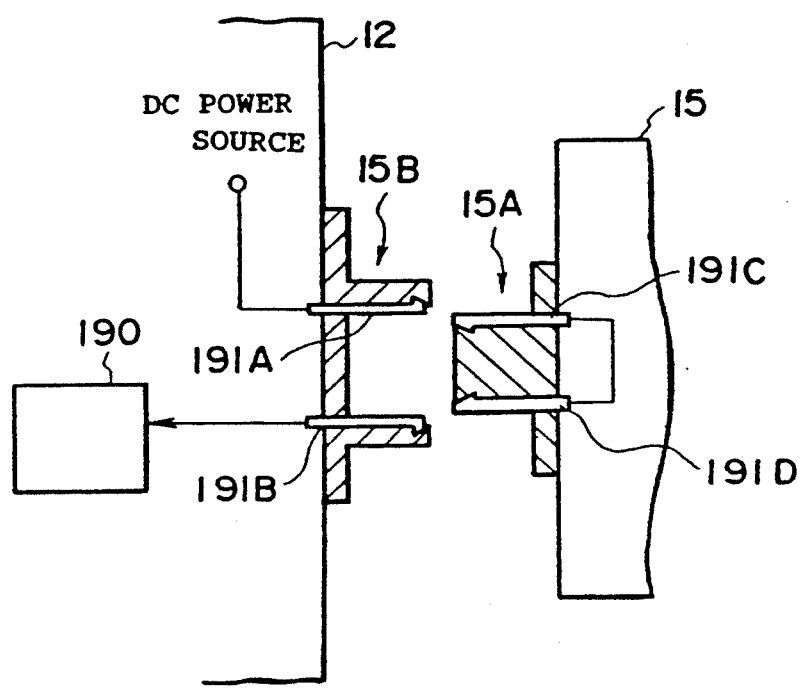
FIG. 10 is a schematic illustration of a construction of coupling portions of a sensitive material magazine case and a frame in the second embodiment.

As shown in FIG. 10, a male set connector 15A as a portion of a detachment detecting means is secured to an inner (left as viewed in FIG. 10) end of the sensitive material magazine case 15. The set male connector 15A is adapted to be fitted into a female set connector 15B serving as another portion of the detachment detecting means and secured to the frame 12. Pins 191A and 191B are secured to the female set connector 15B. The pin 191A is connected to a DC power source (e.g., of a DC 5 bolt), and the pin 191B is connected to the microcomputer 1190. On the other hand, pins 191C and 191D connected by an electric wire are secured to the male set connector 15A and adapted to come into contact with the pins 191A and 191B of the female set connector 15B, when the sensitive material magazine case 15 is mounted in the frame 12. Therefore, an information of attachment or detachment of the sensitive material magazine case 15 to and from the frame 12 is inputted as a DC power source signal to the microcomputer 1190.

It should be noted that a microswitch or the like can be used as a detecting means for detecting the attachment and detechament of the sensitive material magazine case 15 to and from the frame 12.

Other constructions of the present embodiment are the same as in the first embodiment and hence, the description thereof is omitted.

The operation of the second embodiment will be described below, wherein operations similar to those in the first embodiment is omitted.

First, a control routine of the present embodiment will be descirbed. The control routine for the light-sensitive material is the same as that for the image-receiving material and hence, only the former will be described.

Figure 11:
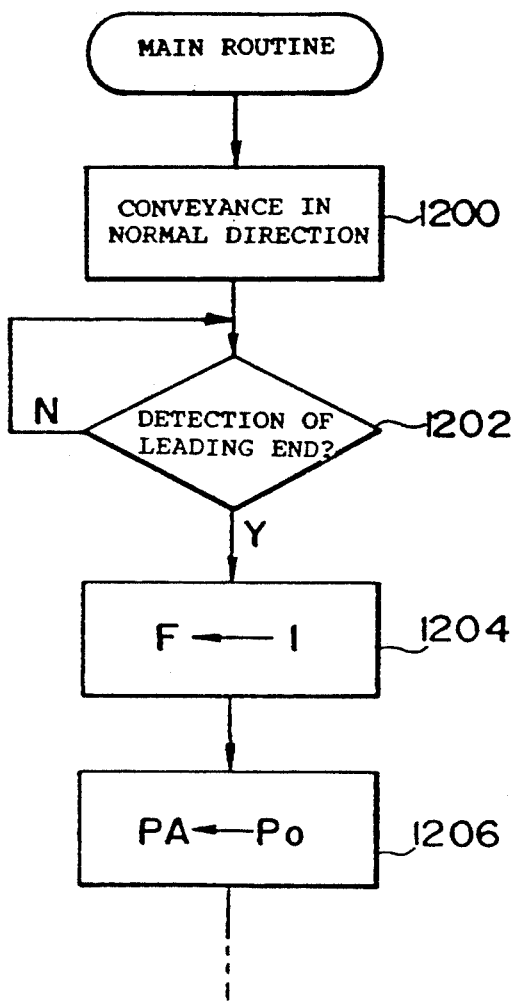
FIG. 11 is a flow chart illustrating a portion of a main routine in the second embodiment.

FIG. 11 illustrates a portion of a main routine started when a reproduction switch (not shown) of the image recording apparatus 1010 is turned on. When the reproduction swtich of (not shown) is started, the motor 17 is rotated in the normal direction at a step 1200, thereby causing the light-sensitive material 16 to be conveyed in a direction away from the sensitive material magazine case 15. When the conveying is started, a pulse is produced from the rotary encoder 19. At a next step 1202, it is judged whether or not the leading end detecting sensor 23 has detected the leading end of the light-sensitive material 16. When it is decided that the leading end has been detected, the leading end detecting flag F is set at a step 1204, and at a step 1206, a value of the size pulse PA is set at a pulse number $P_0$ corresponding to the length, in the conveying direction, of the light-sensitive material 16 of a reporoduction size determined by a reproduction size determining switch (not shown).

Figure 12:
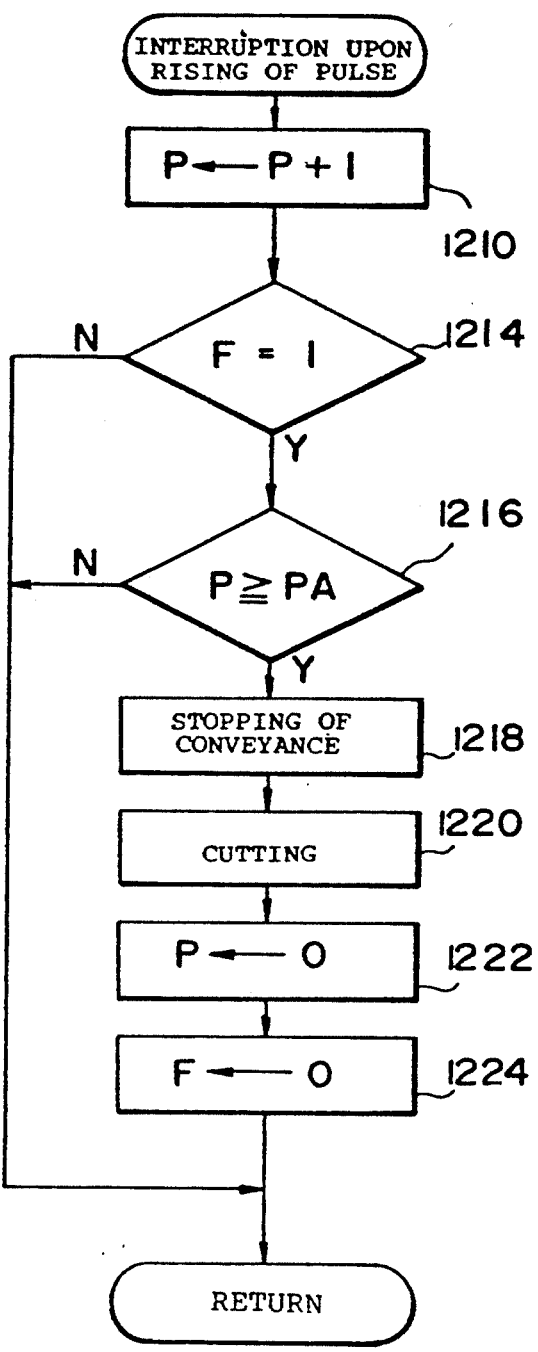
FIG. 12 is a flow chart illustrating an interruption routine started upon rising of a pulse in the second embodiment.

FIG. 12 illustrates an interruption routine started by interruption upon rising of a pulse produced from the rotary encoder 19, wherein the pulse number P is increased at a step 1210. It is judged at a next step 1210 whether or not the leading end detecting flag F has been set. When it is decided that the flag F has been reset, the process is directly returned to the main routine. When it is decided that the flag F has been set, it is judged at a step 1216 whether or not the pulse number P has become equal to or more than the size pulse PA. If $P<PA$, then the process is directly returned to the main routine. If $P \geq PA$, then the conveying of the light-sensitive material 16 is stopped at a step 1218, and a cutting signal is produced at a step 1220 to cut the light-sensitive material 16 by the cutter 20. The pulse number P is reset at a step 1222, and the leading end detecting flag F is reset at a step 1224.

Figure 13:
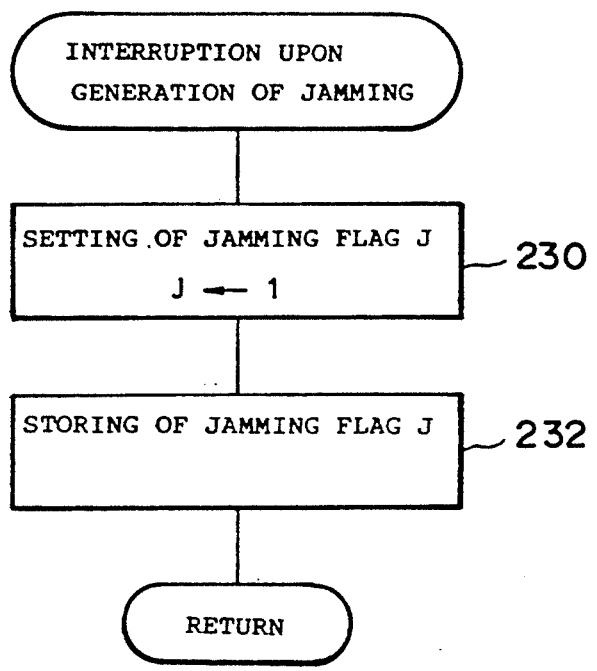
FIG. 13 (A) is a flow chart illustrating an interruption routine started due to a jamming from an output port of the sensitive material magazine case to a cutter in the second embodiment.
Figure 13:
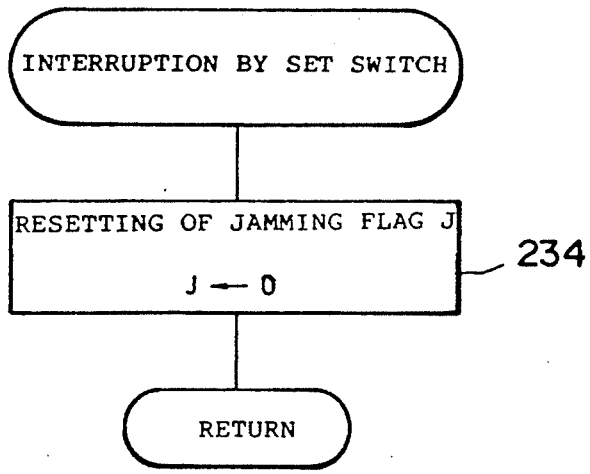

FIG. 13(A) illustrates an interruption routine started by interruption upon occurence of a jamming from a sensitive material outlet port of the sensitive material magazine case 15, wherein such interruption occurs when the leading end of the light-sensitive material 16 dose not reach the leading end detcting sensor 23 within a predetermined time after starting of the conveying of the light-sensitive material in the conveying direction by the motor 17.

At a step 1230, a jamming flag J is set, and at a step 1232, a jumming flag J is stored in the back-up RAM 192. FIG. 13(B) illustrates an interruption routine started by interruption upon riseing (a case detaching information) of a DC 5 V signal received in the microcomputer 1190, when the sensitive material magazine case 15 is pulled out of the frame 12 and thereafter, the magazine case 15 is placed again into the frame 12. At a step 1234, the jamming flag J is reset.

Therefore, during jamming, the snesitive material magazine case 15 is necessarily pulled out by an operator in the above manner, and the presence or absence of the jammed sheet between from the sensitive material outlet port of the sensitive material magazine case 15 to the cutter 20 is ascertained. This makes it possible to prevent forgeting of removal of the jammed sheet between from the sensitive material outlet port of the sensitive material magazine case 15 to the cutter 20.

Figure 14:
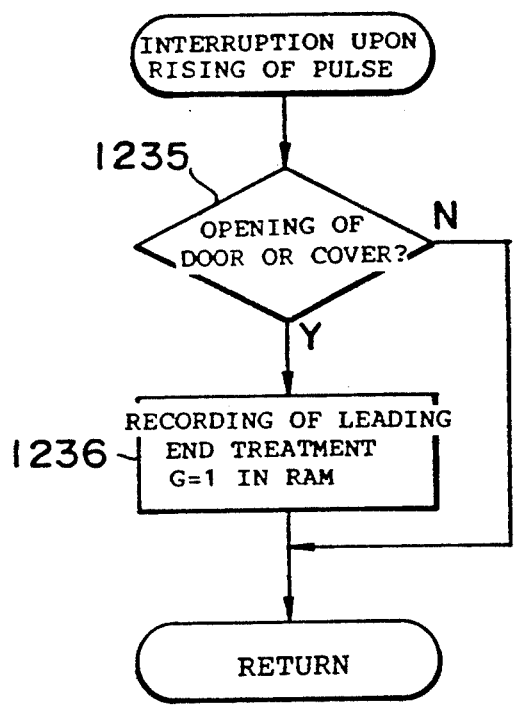
FIG. 14 is a flow chart illustrating an interruption routine started upon rising of a pulse in the second embodiment.

FIG. 14 illustrates an interruption routine started by interruption upon rising of a pulse produced from the rotary encoder 19. At a step 1235, it is judged whether or not at least one of the microswitches 101A, 101B and 101C has been turned off. If it is decided that at least one of the microswitches 101A, 101B and 101C has been turned off when the front door 10A or 10B of the image-recording apparatus 1010 has been opened and the sensitive material magazine 14 or 106 has been pulled out, then a leading end treating flag G is set and stored in the back-up RAM 192 at a step 1236.

Figure 15:
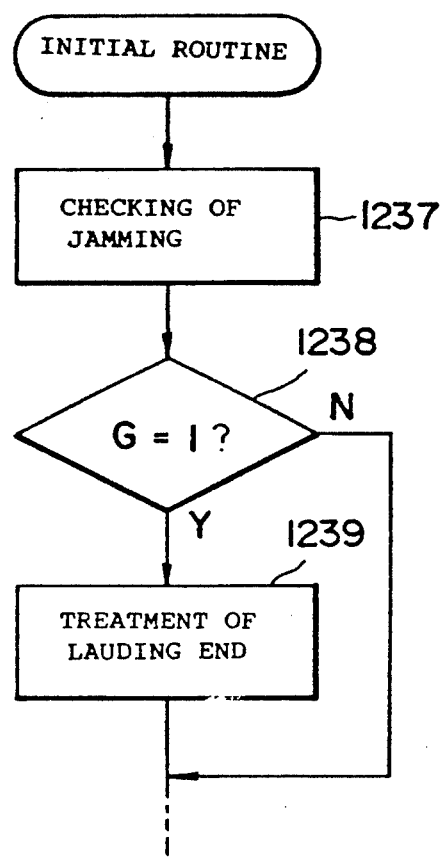
FIG. 15 is a flow chart illustrating a portion of an initial check upon closing of the power source in the second embodiment.

FIG. 15 illustrates a portion of an initial routine started by interruption when the front doors 10A and 10B and the upper portion 10C of the image recording apparatus 1010 have been closed and when the power source has been closed. A check of jamming is conducted at a step 1237. When there is a jamming, a transacion of the jamming is conducted, When there is no jamming, it is judged at a step 1238 whether or not the leading end treating flap G has been set. When it is decided that the leading end treating flap G has bee set, a treatment of the leading end is conducted at a step 1239. More specifically, the light-sensitive material of a predetermined amount is pulled out, for example, a distance (indicated by L in FIG. 9) from the sensitive material magazine case 15 to the cutter 20, and cut and discharged into the sensitive material waste box 178.

Figure 16:
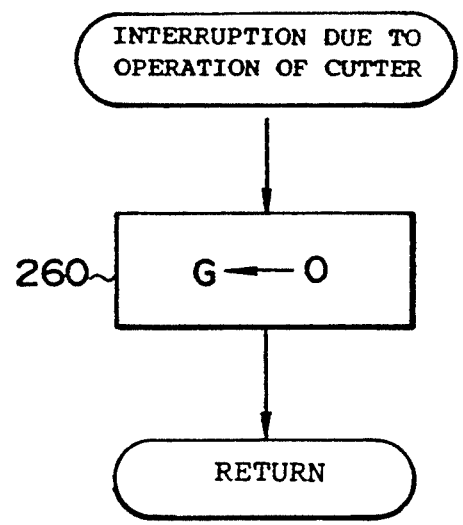
FIG. 16 is a flow chart illustrating an interruption routine started upon starting of the cutter in the second embodiment.

FIG. 16 illustrates an interruption routine started by interruption when the cutter 20 is operated during treatment of the leading end at a step 1254. The leading end treating flag G is reset at a step 1260. Therefore, when the treatment of the leading end is discontinued after cutting of the light-sensitive material 16 into a predetermined length, the leading end treating flag G stored in the back-up RAM 192 is erased. This ensures that when the power source has been closed again, the leading end of the light-sensitive material 16 cannot be cut again and hence, the light-sensitive material 16 cannot be wastful. In addition, because the back-up RAM 192 is backed up by the litium cell or battery 194, the leading end treating flag G is stored in the back-up RAM 912, when the power source of the image recording apparatus 1010 has been opened before cutting of the light-sensitive material 16 into the predetermined length, and the treatment of the leading end is conducted so that the leading end of the light-sensitive material 16 is necessarily cut, when the power source has been closed again.

While the leading end detecting sensor 23 has been described as being disposed in the exposure section 22 in the above-described second embodiment, it is to be understood that it may be disposed in the vicinity of the sensitive material exit of the cutter 20. In addition, although the description in the second embodiment has been made with regard to the treatment of the leading end of the light-sensitive material, the same description can be likewise applied to the treatment of the leading end of an image receiving material. Further, while the above description has been made with regard to the image recording apparatus utilizing a thermally developing and tranbsferring technique, it will be also understood that the present invention is applicable to an apparatus using an image-recording material wound into a rolled form, e.g., a facsimile or the like.

What is claimed is:

1. An image recording apparatus including a containing means for containing an image recording materialing material which is wound in a rolled form and a body in which the image recording material is utilized for recording an image, comprising:
- a feeding means for feeding said image recording material from its one end out of said containing means into said body;
- a measuring means for measuring the length of the image recording material which is fed out;
- a cutter for cutting the fed-out portion of said image recording material;
- a convey means for conveying the cut image recording material pieces within the body to record an image; and
- a control means for controlling said feeding means and said cutter, so that said image-recording material is fed out and cut up to a length required for removal from said body on the basis of the result of measurement by said measuring means, if the conveying of said image recording material pieces by said convey means is discontinued due to any reason.

2. An image recording apparatus according to claim 1, wherein said containing means comprises a case in which said image recording material is wound from the other end thereof in a rolled form and contained.

3. An image recording apparatus according to claim 2, wherein said case is formed attachably to and detachably from said body.

4. An image recording apparatus according to claim 2, wherein said feeding means includes a pair of nip rollers for clamping and feeding-out said one end of said image recording material.

5. An image recording apparatus according to claim 1, wherein said convey means is arranged so that said image recording material conveyed into said body can be accomodated again into said containing means.

6. An image recording apparatus according to claim 1, wherein said control means controls said feeding means to accomodate the cut end of said image-recording material into said containing means after said image recording material is cut into a predetermined length by said cutter.

7. An image recording apparatus according to claim 1, further including a detachment detecting means for detecting whether or not said case has been detached from said body, a jamming detecting means for detecting the occurence of a jamming of said image recording material between an image recording material outlet port of said case and said cutter, a first memory means for storing the occurence of a jamming when such occurnece of the jamming has been detected by said jamming detecting means, and a resetting means for resetting the occurence of the jamming stored in said first memory means on the basis of a signal from said detachment detecting means when said case has been attached again after removal of said case from said body.

8. An image recording apparatus according to claim 1, further including a judging means for judging whether or not said one end of said image recording material is applicable for recording within said body to produce an information indicative of NO if NO, a second memory means for storing said information from said judging means; and wherein said control means is arranged to control the cutter to cut said one end and erase said information stored in said second memory means after cutting of said one end, when said information has been stored in said second memory means.

9. An image recording apparatus comprising:
- a case in which an image recording material is wound from its one end in a rolled form and contained;
- a delivery means for delivering said image recording material from the other end thereof out of said case into a body of the image recording apparatus;
- a measuring means for measuring the delivery length of the image recording material delivered;
- a cutter for cutting the delivered image recording material into pieces of a predetermined length on the basis of the result of measurement by said measuring means;
- a convey means for conveying said cut image recording material pieces within said body to record an image; and
- a control means for controlling said delivery means and said cutter, so that said image-recording material is delivered and cut up to a length required for removal from said body on the basis of an information from said measuring means, if the conveying of said image recording material pieces by said convey means is discontinued due to any reason.

10. An image recording apparatus according to claim 9, wherein said case is formed attachably to and detachably from said body.

11. An image recording apparatus according to claim 10, wherein said delivery means includes a pair of nip rollers disposed at an outlet of said case for said image recording material for clamping said the other end of said image recording material to deliver said image recording material through said outlet.

12. An image recording apparatus according to claim 11, wherein said delivery means includes a motor disposed in said body for driving said nip rollers in a direction to deliver said image recording material during rotation in one direction.

13. An image recording apparatus according to claim 12, wherein said control means controls said motor, so that said motor is rotated in an opposite direction after said image recording material is cut into a predetermined length by said cutter, thereby causing the nip rollers to accomodate the cut end of said image recording material into said case.

14. An image recording apparatus according to claim 13, further including a detachment detecting means for detecting whether or not said case has been detached from said body, a jamming detecting means for detecting the occurence of a jamming of said image recording material between an image recording material outlet port of said case and said cutter, a first memory means for storing the occurence of a jamming when such occurence of the jamming has been detected by said jamming detecting means, and a resetting means for resetting the occurence of the jamming stored in said first memory means on the basis of a signal from said detachment detecting means when said case has been attached again after removal of said case from said body.

15. An image recording apparatus according to claim 13, further including a judging means for judging whether or not said other end of said image recording material is applicable for recording within said body to produce an information indicative of NO if NO, a second memory means for storing said information from said judging means; and wherein said control means is arranged to control the cutter to cut said other end and erase said information stored in said second memory means after cutting of said other end, when said information has been stored in said second memory means.

16. An image recording apparatus according to claim 9, wherein said image recording material comprises one of a light-sensitive material and an image receiving material onto which an image of the light-sensitive material is transferred.

* * * * *